Dec. 4, 1928.

S. E. RAHE 1,693,937

MACHINE FOR CUTTING MATCH SPLINTS

Filed Jan. 9, 1926

INVENTOR,
Samuel E. Rahe.
BY
W. P. Hutchinson,
ATTORNEY

Dec. 4, 1928.

S. E. RAHE 1,693,937

MACHINE FOR CUTTING MATCH SPLINTS

Filed Jan. 9, 1926       7 Sheets-Sheet 2

INVENTOR,
Samuel E. Rahe,
BY
W. B. Hutchinson
ATTORNEY

Dec. 4, 1928.
S. E. RAHE
1,693,937
MACHINE FOR CUTTING MATCH SPLINTS
Filed Jan. 9, 1926　　7 Sheets-Sheet 3
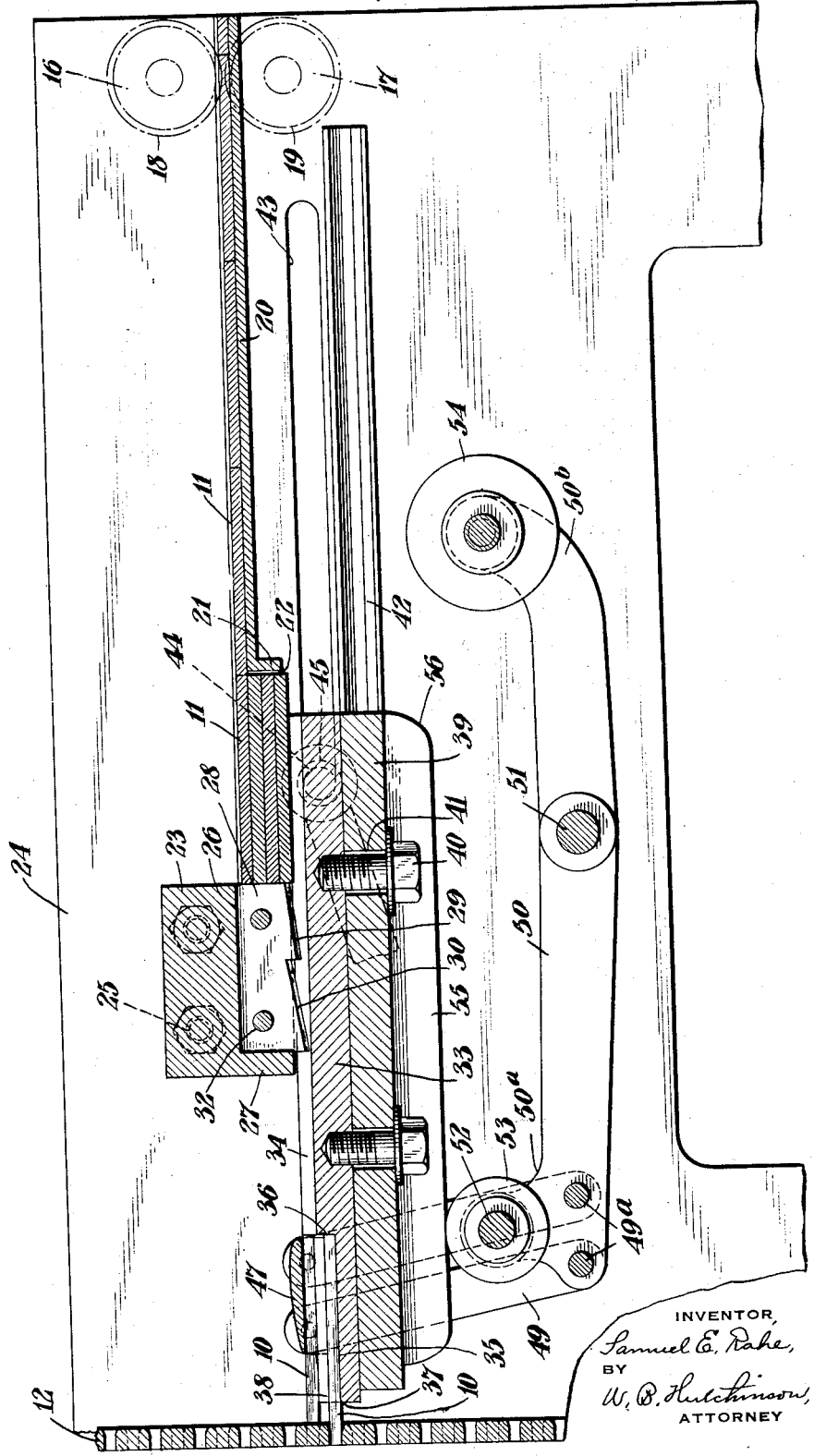
INVENTOR,
Samuel E. Rahe,
BY
W. B. Hutchinson,
ATTORNEY

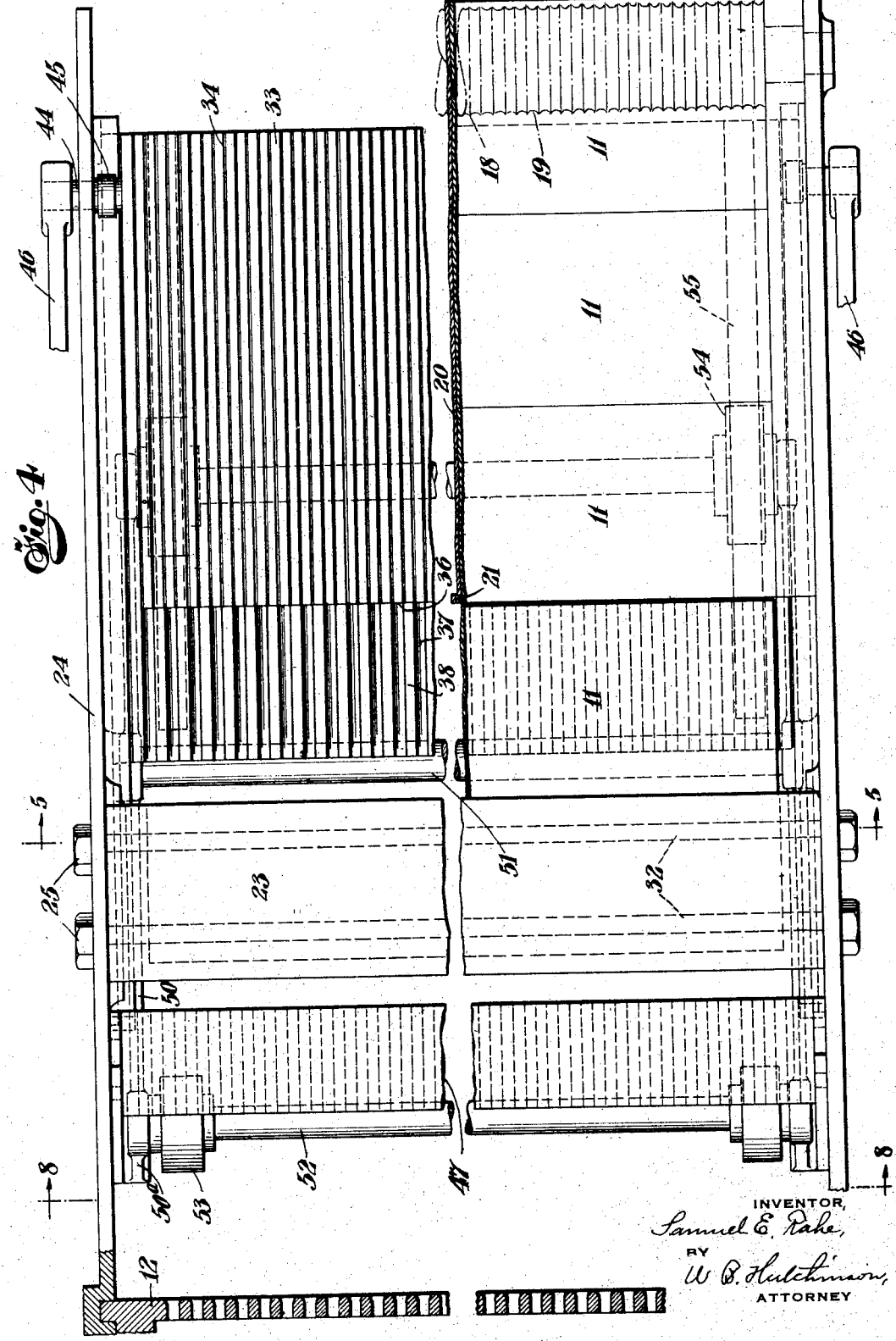

Dec. 4, 1928.  
S. E. RAHE  
1,693,937  
MACHINE FOR CUTTING MATCH SPLINTS  
Filed Jan. 9, 1926   7 Sheets-Sheet 5
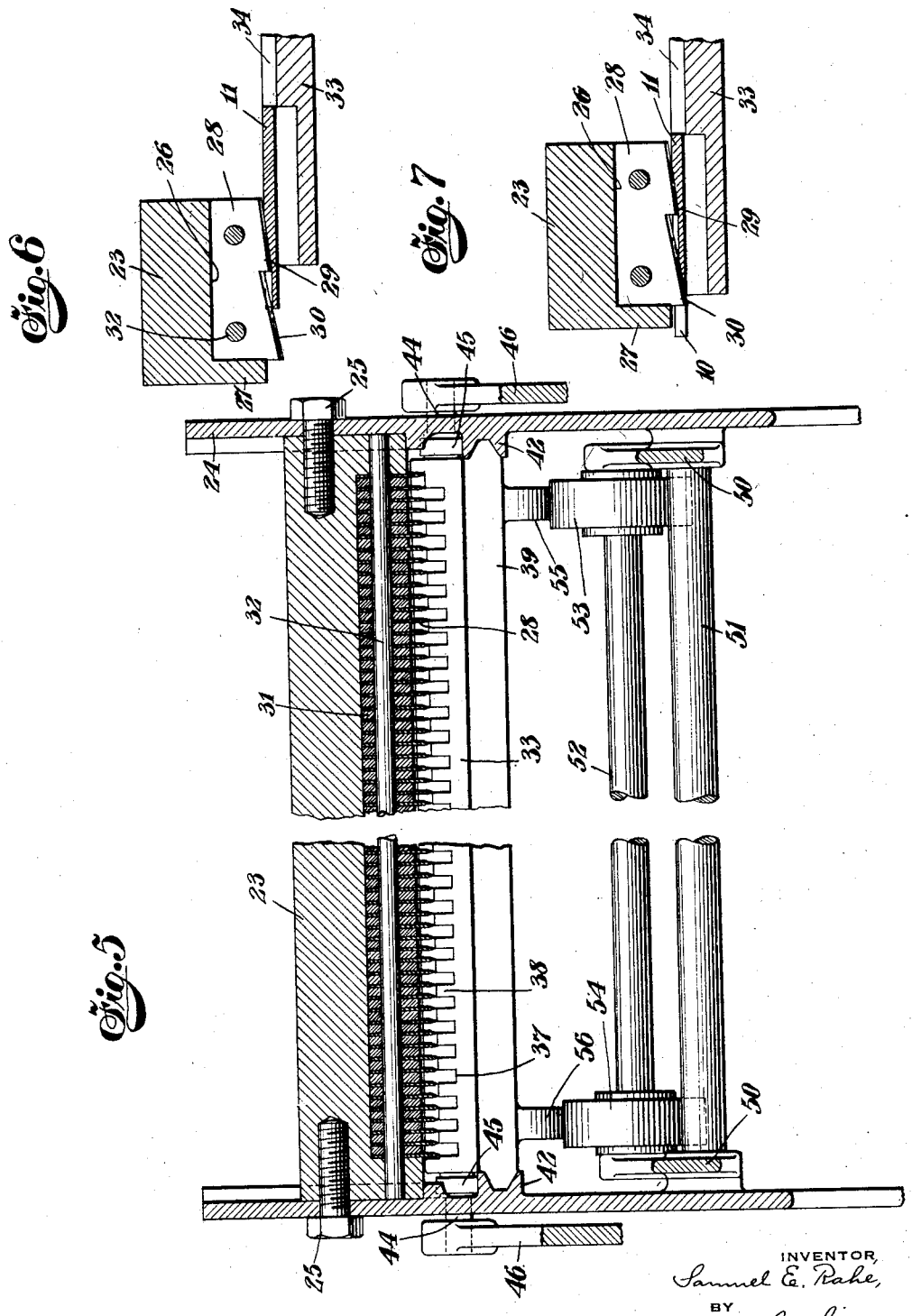
INVENTOR,  
Samuel E. Rahe,  
BY  
W. P. Hutchinson,  
ATTORNEY Dec. 4, 1928.  S. E. RAHE  1,693,937
MACHINE FOR CUTTING MATCH SPLINTS
Filed Jan. 9, 1926  7 Sheets-Sheet 6
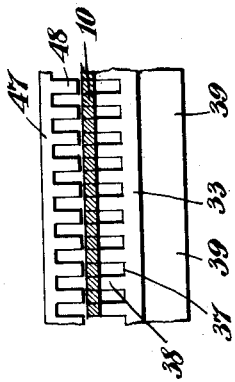
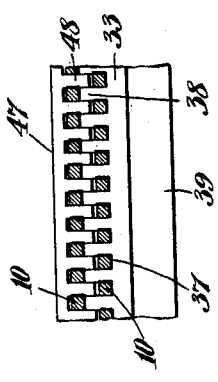
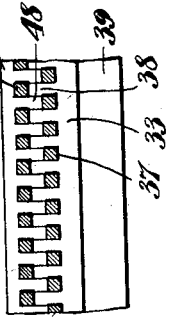
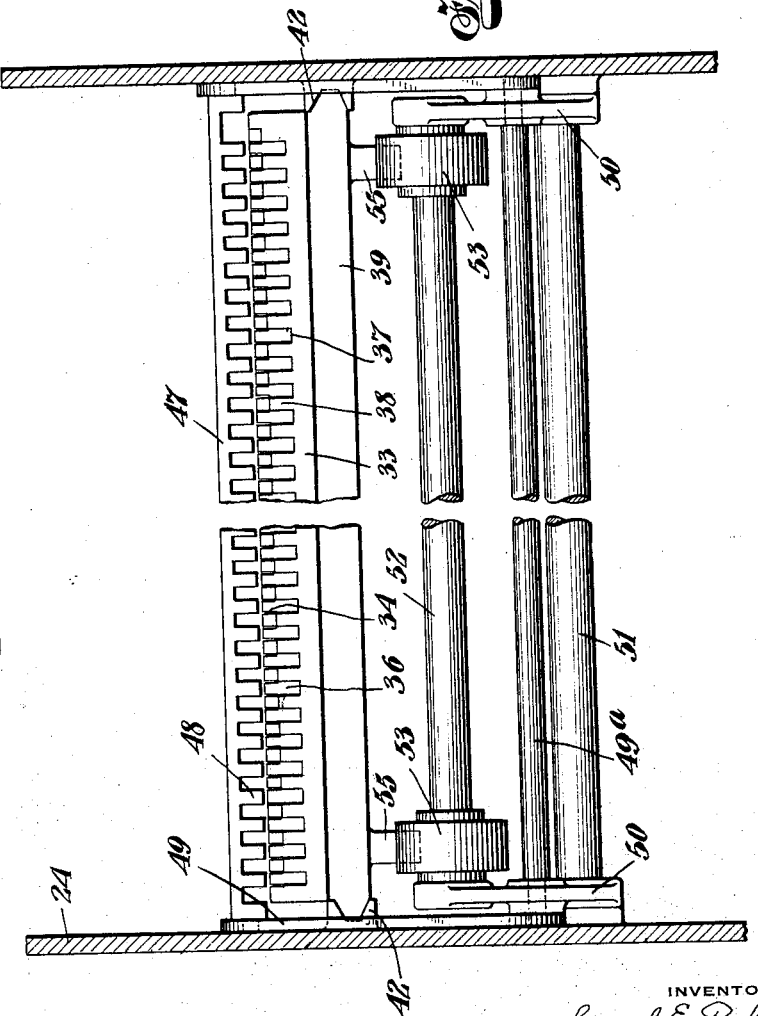
INVENTOR,
Samuel E. Rahe,
BY
W. P. Hutchinson,
ATTORNEY Dec. 4, 1928.                                                        1,693,937
S. E. RAHE
MACHINE FOR CUTTING MATCH SPLINTS
Filed Jan. 9, 1926                   7 Sheets-Sheet 7
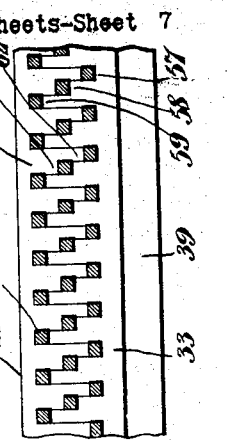
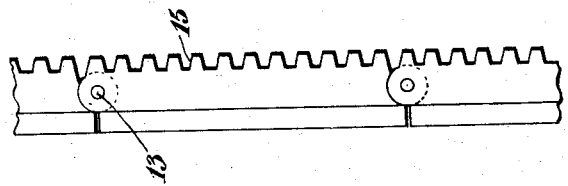
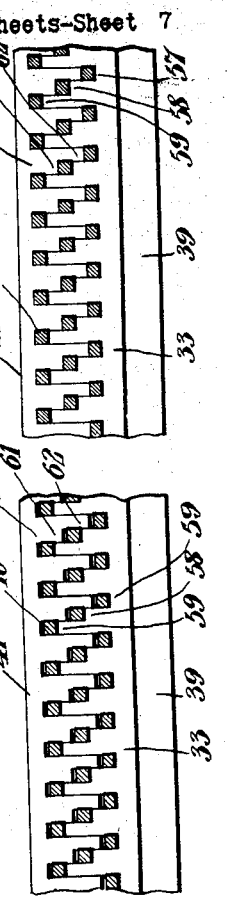
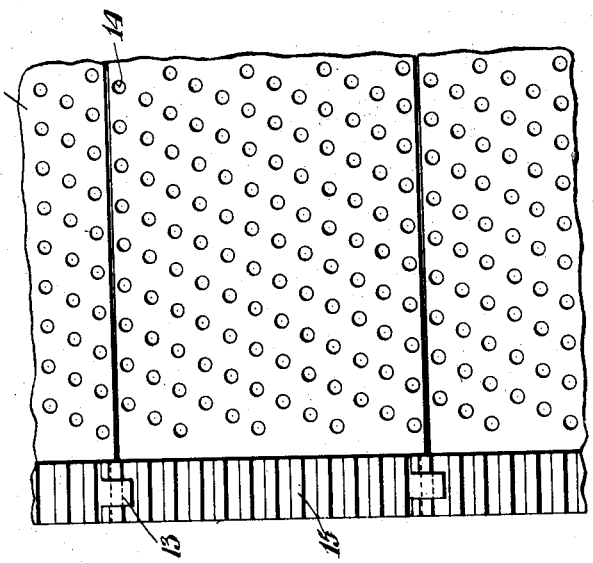
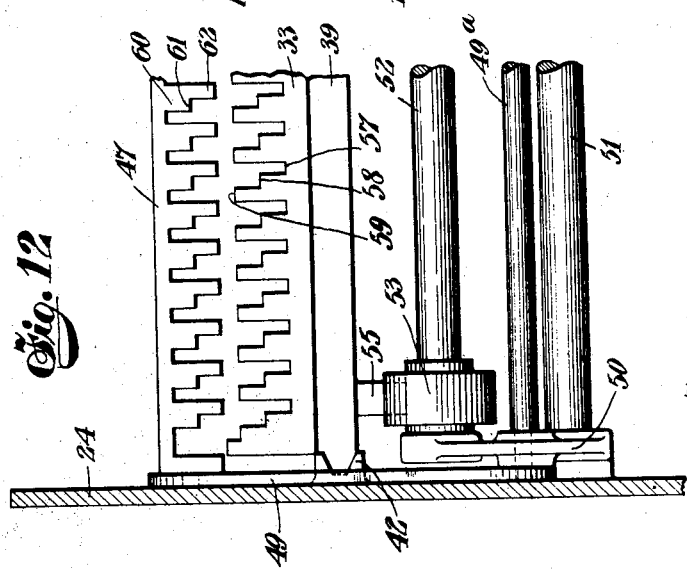
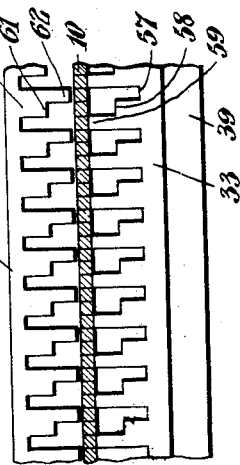
INVENTOR,
Samuel E. Rahe,
BY
W. B. Hutchinson,
ATTORNEY Patented Dec. 4, 1928.

1,693,937

UNITED STATES PATENT OFFICE.

SAMUEL E. RAHE, OF RICHMOND HILL, NEW YORK.

MACHINE FOR CUTTING MATCH SPLINTS.

Application filed January 9, 1926. Serial No. 80,250.

My invention relates to improvements in a machine for cutting match splints, and more particularly for cutting match splints from sheet stock, and especially wood veneers. The most general practice in the manufacture of match splints from sheet stock, and especially wood veneers, is to cut the stock into strips, the width of which corresponds to the length of the matches, then cut these strips into splints either by choppers in which the knives work up and down against the stock, or by rotary cutters, after which the splints are dried, cleaned, tumbled, and assembled in straight position ready for packing or insertion in the carrier of the dipping machine. In handling stock in this way there are many disadvantages. The splints are never cut satisfactorily, that is so as to leave a perfectly smooth clean cut, but there are always more or less fibers or fuzziness on the splint surfaces, many splints are broken, and there is a great loss in the several handlings of the splints, while finally it is difficult to get them in proper position and insert them satisfactorily in the carrier of the match dipper. Sometimes the splints are cut from stock strips, and in the endeavor to avoid the above difficulties they are pushed through guide grooves which separate them the desired distance, and this means has not proved entirely satisfactory on account of the clogging and the difficulty in properly separating the splints.

The most desirable way of cutting the splints so as make a smooth nice surface at the cut edges, is to cut them with a drawing cut, but heretofore this has not been possible for the reason that while the cuts are made lengthwise of the grain, still the grain is never absolutely straight, and the knives will follow the grain and splinter the splints. I have discovered, however, a means of cutting the stock while dry in a perfectly smooth manner, and with a drawing cut as one would cut them with a pocket knife, and still avoid the splintering. My improved method consists in cutting the splints this way and in the subsequent handling of them, and my improved apparatus or machine is intended to carry out this result perfectly, to avoid any handling of the splints, and to deliver them, if desired, directly into the carrier of the match dipper without any possible disarrangement of the formed splints.

In carrying out this idea, I cut stock strips of the desired length, which are dried, and then pushed while held against displacement, across the face of a cutter which has thin blades properly spaced to produce splints, and with blades arranged one behind the other and of different depths, so that as the stock is pushed across the cutter, an incision will be first made partly through the flat face stock, and the following blade or blades will complete the severance of the splint, and as the stock is held against lateral displacement, and is cut progressively by knives following each other, no splintering occurs, and an absolutely smooth cut is made leaving the cut surface of the splint as smooth as can be desired. In some cases the feed rolls which feed the stock to the machine can be grooved if desired, and with knife edges at the termini of the grooves, so that the feed rolls will make the first incision, and the feed rolls may have the corrugations concaved so as to partially round or shape the splints if desired. Furthermore, by my improvement I cut the stock directly in its holder, and with the stock directly over the individual splint holders, which can be produced to advantage in a pusher plate, and so when the stock is cut, the splints never lose their correct position; and to get the desired separation for insertion in the carrier of the dipper, I simply displace them bodily and vertically so that they will lie in individual holders and in different horizontal planes in the pusher plate, and thus they are held so that there is no possible disarrangement, and the pusher plate is adjusted so as to insert the splints directly into the carrier of the dipping machine, and there is no chance for loss or clogging. To make this arrangement more certain I provide a comb or keeper which acts automatically to push the splints down into their proper holders, and the keeper or comb will lie above the splints so as to prevent any possible displacement while they are being inserted in the carrier of the dipper.

The machine which I have devised is adapted to operate with remarkable speed and insert the splints as cut directly in the carrier as aforesaid, and if desired the splints may be deposited at the end of the pusher plate ready for packing, in case it is desired to pack them instead of putting them into the dipper. These and other advantages will appear more clearly from the description which follows.

Reference is to be had to the accompanying drawings forming a part of this specification, in which similar reference characters indicate corresponding parts in all the views.

Figure 3 is a view similar to Figures 1 and 2 but shows the pusher plate advanced so as to insert the match splints in the carrier of the dipping machine.

Figure 4 is a broken sectional plan of the machine with a part of the feed table removed.

Figure 5 is a cross section on the line 5—5 of Figure 4.

Figure 6 is a detail section showing the first position of the cutting blades with reference to the stock as the latter is pushed across the cutter.

Figure 7 is a view similar to Figure 6, but showing a further advance of the stock, and with the cutting blades projecting through it.

Figure 8 is a sectional end view on the line 8—8 of Figure 4.

Figure 1:
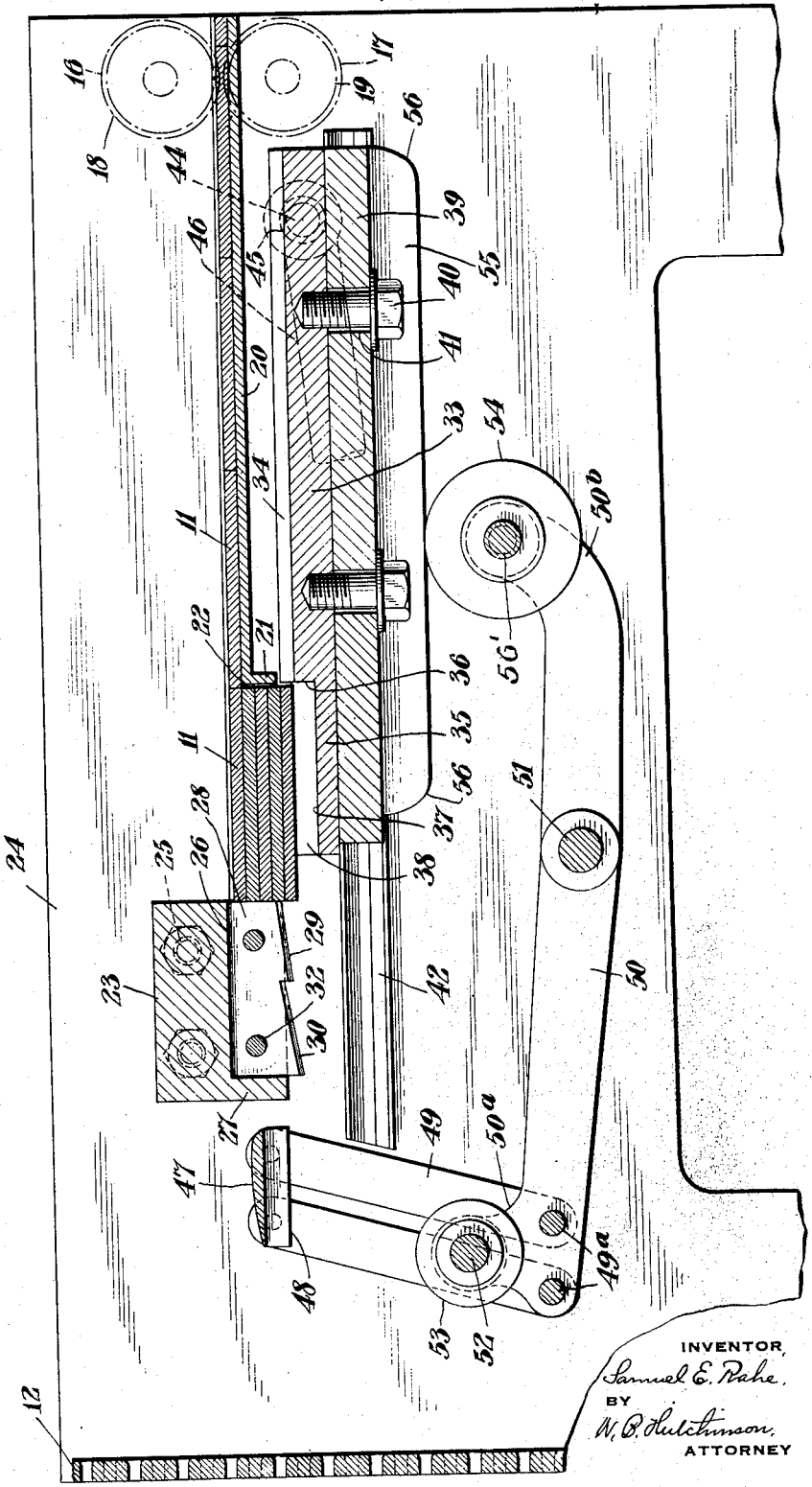
Figure 1 is a longitudinal sectional elevation of the machine embodying my invention and adapted to carry out my improved method, showing the stock about to be advanced across the cutter.

Figure is a broken detail showing the first position of the cut stock with reference to the splint holders and comb or keeper.

Figure 10 is a view similar to Figure 9 showing the displacement of the splints into their holders by the comb.

Figure 11 is a view similar to Figures 9 and 10 but with the splints in their final position in their holders.

Figure 12 is a broken sectional end view showing a modified form of the holders and comb or keeper, in which the splints are held in three rows.

Figure 13 is a broken face view of the common form of dipping carrier.

Figure 14 is an edge view of the carrier shown in Figure 13.

Figure 15 is a broken detail showing the position of the stock before it is pushed into the holders illustrated in Figure 12.

Figure 16 is a view similar to Figure 15 but showing a further movement of the placing comb and the splints, and Figure 17 is a view like Figure 16 except that the splints are in their final position in their holders.

As illustrated the match splints 10 are cut from strips of veneer 11 and inserted in the carrier 12 of the dipping machine. This is shown as a conventional carrier having plates hinged together at 13 with rows of holes 14 to receive the match sticks, the holes of one row being staggered with relation to the next row, and with a rack 15 at the edges by which the carrier is moved.

Figure 2:
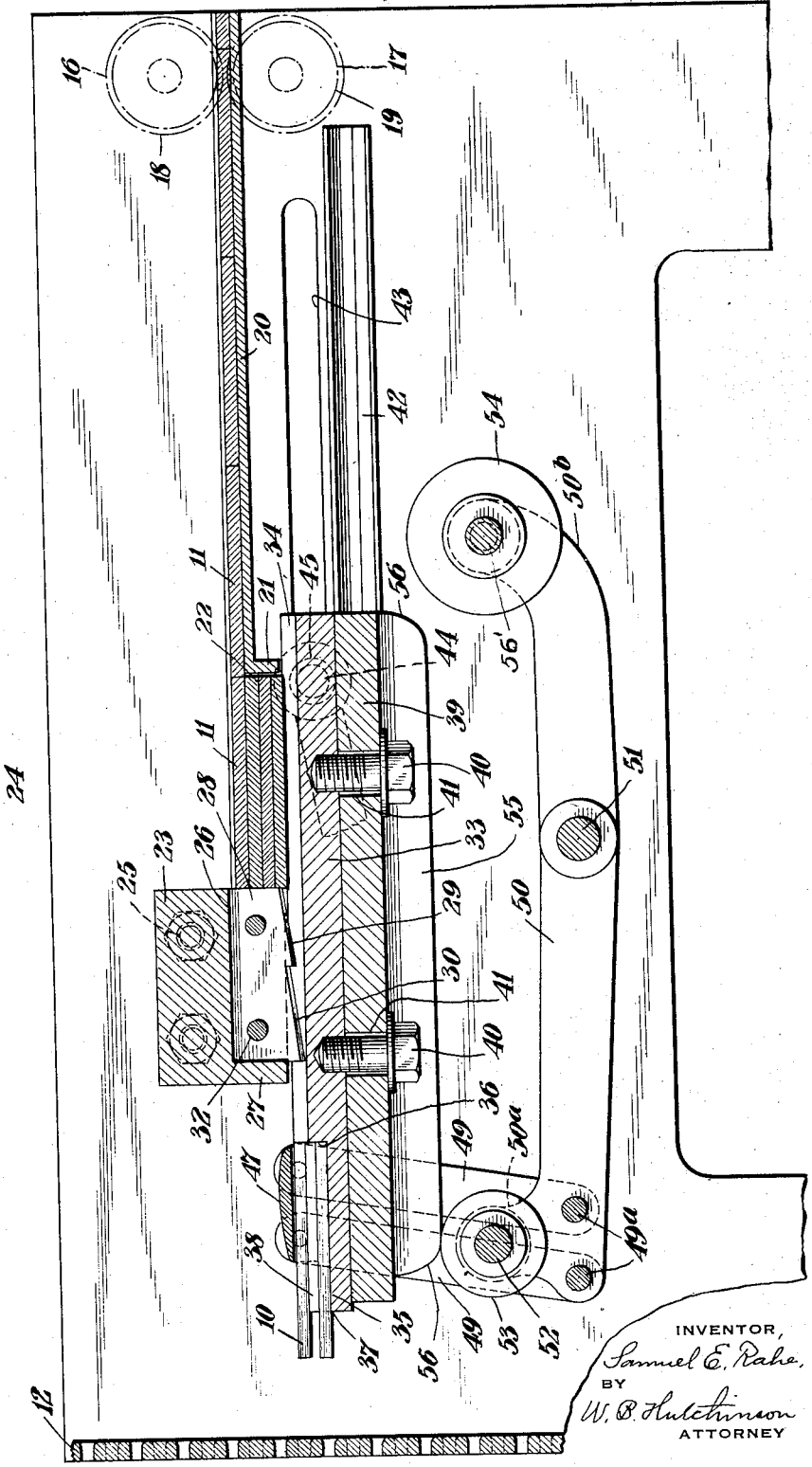
Figure 2 is a similar view but showing another position of the stock with a strip cut into splints, and the splints in their holders.

The stock strips 11 are fed transversely into the machine by means of feed rollers 16 and 17 arranged one above the other, and there is no novelty in this arrangement. The rollers may be plain if square splints are to be cut that is splints which are square in cross section, or they may be corrugated as illustrated, and with the corrugations having knife edges 18, and with the part between them concave as shown at 19 in Figure 4, so that as the stock is fed through, the edges 18 will make incisions in opposite sides thereof, and the pressure of the rolls will force the stock into the concave part 19, partly rounding the splints. The stock has the grain running transversely of it as usual, and these strips 11 which have been previously dried, are fed in transversely in contact with each other, and over the feed table 20 shown in Figures 1, 2 and 3, this table at its inner end terminating in a down turned flange 21 forming a stock receiving recess between the flange 21 and the cutter head 23. This comprises a head or block which is arranged transversely in a horizontal plane between the sides 24 of the frame, and the block is recessed on the under side as shown at 26, leaving a depending flange 27 at the inner side of the block, and this recess is adapted to receive the knives 28, which are thin steel strips, and have blades 29 and 30, with cutting edges projecting below the head 23, as shown in Figures 1 to 3, and it will be noticed that the blade 30 is a little deeper than the blade 29, so that as the stock strip 11 is pushed across the cutter, the blade 29 of each knife 28 will cut partly through the flat face of the stock which is held at the ends so that it cannot spread, and the blade 30 will complete the incision. In this way the stock is prevented from splintering, and as the blades are very thin, the stock will yield enough to permit the passage of the blades through it. Obviously the blades 29 and 30 might be separated, or a greater number of them might be arranged in series, but I find two satisfactory, and it is more convenient to have the blades on one strip or knife 28. Likewise it will of course be evident that the cutter might move with reference to the stock with the same effect. The head or block 23 is held in place by bolts 25, although it can be held in any suitable way.

Referring to Figure 5, it will be seen that as shown the knives 28 are suitably spaced by spacing blocks 31 inserted between them, and they are held in position by cross bolts or rods 32 which extend through the several blades and blocks. This is a common arrangement for cutter heads, and no claim is made for this particular means of holding the knives, on the other hand they may be held or fastened in any other suitable way to hold them in proper spaced parallel relation, without affecting the invention.

As a means of handling and holding the cut splints, I prefer to use the pusher plate 33 which moves backward and forward opposite the face of the cutter, and this plate has longitudinal slits 34 through the greater part of its length, these aligning with the blades 29 and 30 as shown in the drawings. The inner top portion of the pusher plate is recessed to the depth shown at 35 in Figures 1 to 3, leaving a shoulder or abutment at the end of the recess as shown at 36, and this recessed part is divided into splint grooves 37 (see Figure 5) by ribs 38, and the grooves and ribs are each the width of a match splint, so that as a strip of stock is cut into splints, it will lie after the incisions through it have been made, directly above the ribs 38 and grooves 37, as shown in Figure 9. The means for placing the splints in the grooves and on the ribs, will be referred to hereinafter.

As a convenient means of reciprocating the pusher plate 33, I use a sliding carriage 39 to which the pusher plate is attached by bolts 40 passing through holes 41 in the carriage and into the pusher plate. The carriage has its side edges fitted to run in horizontal tracks 42 (see Figure 5) on the inner sides of the machine frame, and the carriage can be actuated in any convenient way. I have shown slots 43 through the sides of the frame, and the carriage is connected with studs 44 which pass through the slots and which have fixed collars 45 on the inner sides of the frame, to act as guides. The outer sides of the studs connect with pitmen 46 which can be given the desired movement by any suitable mechanism so as to move the carriage and pusher plate backward and forward.

Just above the inner end of the pusher plate 43 when the pusher plate is drawn back from the carrier 12, I arrange a comb or keeper plate 47 which moves up and down with relation to the pusher plate, and this is provided with ribs 48 spaced apart and adapted to register with the grooves 37 of the pusher plate 33 as shown clearly in Figure 8. These ribs 48 are long enough to bear on a substantial portion of the match sticks 10 so as to push them nicely into their holders or grooves, and act as guides when the splints are inserted in the carrier 12, as presently described. The keeper plate or comb can be moved in any suitable mechanical way, but I have shown it connected at the ends with a pair of links 49, these being pivoted to the ends of the comb near opposite sides of the latter so as to make a perfect balance and move the comb accurately, and the links at their lower ends are pivoted to the inner ends of rocking arms 50 which are placed near opposite sides of the machine so as to properly balance the comb in its movements. The arms 50 are pivoted on a transverse shaft 51 (see Figures 1 to 3), and their inner ends are formed into brackets 50ᵃ which support the shaft 52 carrying rollers 53, while the outer ends of the rocking arms 50 are turned up as shown at 50ᵇ, and carry a shaft 56' for supporting rollers 54. The rollers 53 and 54 are adapted to contact with the cam tracks 55 on the under side of the carriage 39. Thus it will be seen that when the carriage 39 and pusher plate 33 are drawn towards the feed rollers 16 and 17, the tracks 55 striking the rollers 54 will depress the outer ends of the rocking arms 50, raising the inner ends, and lifting the comb 47 clear of the pusher plate but when the carriage 39 is moved in the opposite direction, and the splints have been cut from the stock 11 by the blades 29 and 30, the tracks 55 will strike the rollers 53, thus depressing the front ends of the rocking arms 50, pulling down on the links 49, and moving the comb 47 downward so that the ribs 48 (see Figure 9) will push every other splint downward into the housing grooves 37 of the pusher plate, while the splints not so pushed by the ribs will be forced downward upon the tops of the ribs 38, and this movement will be gradual so that the splints will not be too abruptly distributed. The progressive movement is illustrated in Figures 9 and 10, the final depression of the comb causing half the splints to lie in the bottom of the grooves 37, while the remaining splints will lie on the tops of the ribs 38 and between the ribs and the back of the comb 47. Thus the splints are firmly held, and as the pusher plate continues towards the carrier 12 (see Figure 3), the links 49 accommodate themselves to the movement, and the splints are held securely so that there is no possibility of their being displaced until their ends are inserted in the holes 14 of the carrier 12. Obviously the splints might just as well be inserted in some other holding means in another form of carrier without affecting the invention, but it will be observed that the splint stock is cut while it is securely held, the formed splints are not separated laterally but are simply displaced in part in a vertical plane so as to bring them in different horizontal planes, but always in parallel relation, and they are positively inserted in the holding means of the carrier 12 before there is any chance for the displacement of a single splint. The carrier 12 in most match dipping machines has an intermittent or step by step movement, and it will be understood that the splint cutting machine will be timed so that the final movement of the pusher plate occurs while the carrier 12 is stationary, and the adjustment of the comb 47 is such that it does not bear so heavily upon the splints 10 (see Figure 3), but that it may slide off the splints when the pusher plate begins its return movement.

I have described means for displacing the splints vertically so as to form two horizontal rows of splints in staggered relation, but if it is desired to have more rows it can easily be accomplished, and I have shown the means for doing this in Figures 12 to 17. As here illustrated the pusher plate 33 has a series of spaced grooves 57 instead of the grooves 37, and ribs 59 of the width of a match splint, but of twice the height of the ribs 38 previously referred to, and these ribs are of double match thickness at the bottom, and have match holding shoulders 58 on the sides. The comb is correspondingly shaped, having thick ribs 60 with the shoulders 61 adapted to register with the shoulders 58, and with the extensions 62 adapted to register with the grooves 57, so that when the stock is in the position shown in Figure 15, the depression of the comb 47 will displace the splints as shown in Figure 16, and the final movement of the comb will bring the splints to the position shown in Figure 17, with a row in the bottom of the grooves 57, another row on the shoulders 58, and another row on the tops of the ribs 59.

It will be further observed that when the stock strip 11 (see Figures 1 to 3), is depressed on the holder or recessed part 35 of the pusher plate when the latter is in its most forward position, the front edge of the stock will have the upper part of the pusher plate as an abutment, while the stock lies on the tops of the ribs 38.

The operation of the machine as a whole is as follows. The strips of stock 11 are cut to the desired length and dried, and if they are of wood veneer, the grain runs transversely of each strip. These strips are fed transversely over the feed tables 20 by the feed rollers 16 and 17, which as stated may be grooved or plain, and at the end of the feed table the strips 11 drop into their holder, and when the pusher plate 33 is in its most forward position, the lower strip 11 drops into the recessed inner end of the pusher plate. As the pusher plate moves inward, the lower strip of stock is pushed across the blades 29 and 30, which progressively sever the stock as shown in Figures 6 and 7, and the severed but undisplaced stock lies on the tops of the ribs 38 as shown in Figure 9. As the pusher plate advances further, the tracks 55 of the carriage strike the rollers 53 and pull down the comb 47 as shown in Figure 2, so as to displace the splints 10 vertically but not otherwise, and hold them in the desired position. As the pusher plate advances still further, the splints 10 are inserted in the carrier 12 ready for dipping. On the reverse movement of the pusher plate and its carriage, the tracks 55 strike the rollers 54, tilting the locking arms 50, and raising the comb 47 to permit the passage of the next row of splints beneath it. Thus it will be seen that I have produced a machine which is very simple when the amount of work done with it is considered, which provides for cutting splints with a drawing cut to render them perfectly smooth, which holds the stock and splints so that the latter are never displaced until released in their carrier, and which has an enormous capacity.

While it is desirable to insert the splints in the carrier of the dipping machine, still it often happens that splints are packed for shipment to other countries or places where suitable timber and machinery are not available, and it will be seen that the formed splints can be discharged from the end of the cutting mechanism in parallel relation ready for packing, instead of inserting them in the carrier 12, and it will be further observed that while the machine is especially intended and is particularly adapted for cutting wood veneers, it can be made to cut any other sheet stock suitable for match making, with equal facility.

I claim:—

1. A match splint machine having a cutter with thin fixed blades of different depths and inclined edges one behind the other, and spaced laterally the width of a match splint apart, and a pusher plate movable opposite the blade edges for feeding sheet stock across the cutter whereby the blades cut progressively through the stock.

2. In a match splint machine a fixed cutter having thin blades of different depths and inclined edges one behind the other and spaced apart, and a pusher plate reciprocating opposite the blade edges for advancing sheet stock across the cutter and against the blade edges whereby the latter cut progressively through the stock.

3. A match splint machine comprising a stock feed, a series of blades of different depths and inclined edges arranged one behind the other and spaced laterally adapted to engage the stock with a drawing cut as the stock is advanced against the blades, and a pusher plate shaped to receive strips of stock and movable opposite the blade edges.

4. A match splint machine comprising thin spaced blades in parallel relation, and a pusher plate adapted to carry stock against the blades and having individual splint holders to receive the splints cut by the blades.

5. A match splint machine having thin spaced blades in parallel relation, and a pusher plate to carry stock against the blades, said pusher plate having a place to hold the stock strip, and individual splint holders below the stock holder.

6. A match splint machine having thin blades of different depths one behind the other and spaced laterally, and a pusher plate movable opposite the blade edges and having means for holding a strip of stock, and individual splint holders to receive the cut splints.

7. A match splint machine having thin blades of different depths one behind the other, spaced laterally, and a pusher plate movable opposite the blade edges having means for holding the stock strip to carry it against the blade edges, and individual splint holders directly below the stock holding means.

8. A match splint machine having a cutter with thin blades of different depths one behind the other and spaced laterally, means for carrying a strip of stock against the blade edges so that the latter act with a drawing cut to cut the stock into splints, and individual splint holders directly below the stock carrying means.

9. A splint cutting machine comprising a cutter having thin spaced blades and a pusher plate sliding opposite the blades, said pusher plate having a stock receiving recess near its front end, and individual splint holders directly beneath the stock holder.

10. A match splint machine comprising a cutter having thin spaced blades, and a pusher plate sliding opposite the blades, said pusher plate having a stock receiving recess near its front end, and splint holding grooves in the bottom of said recess.

11. A match splint machine having thin spaced blades and a pusher plate sliding opposite the blades, said pusher plate having a stock receiving recess near its front end, and individual splint holding grooves in the bottom of said recess, the recess and grooves being disposed so that the splints in the grooves will project beyond the end of the plate.

12. A match splint machine having a cutter with thin spaced blades and a pusher plate sliding opposite the blades, said pusher plate having a stock receiving recess near its front end, and individual splint holding grooves in the bottom thereof, said grooves being separated by flat topped ribs whereby a portion of the cut splints may lie in the grooves and the remainder may lie on the tops of the ribs.

13. A match splint machine comprising a cutter having thin spaced blades of different depths arranged to cut progressively through the stock, and a pusher plate sliding opposite the blades, said pusher plate having a stock receiving recess near its front end, and individual splint holders directly beneath the stock holder.

14. A match splint machine comprising a cutter having thin spaced blades of different depths adapted to cut progressively through the stock, and a reciprocating pusher plate movable opposite the cutter and having a stock receiving recess and individual splint holders to receive the cut splints.

15. A match splint machine comprising a cutter having thin spaced blades, a sliding carriage movable opposite the cutter, and a pusher plate secured to the carriage and having means for holding a stock strip and individual match splint holders connected with the stock holding means.

16. A match splint machine comprising a cutter having thin spaced blades, a pusher plate movable across the face of the cutter and having a stock holding means and individual splint holders connected with said means, and a comb arranged to push the cut splints into their individual holders.

17. A match splint machine comprising a cutter having thin spaced blades, a pusher plate sliding across the face of the cutter, said plate having means for holding a strip of stock, and individual splint holders connected with the stock holding means, and a comb movable back and forth with relation to the pusher plate and adapted to push the cut splints into the individual holders of the plate.

18. A match splint machine comprising a cutter having thin spaced knives, a pusher plate movable across the face of the cutter having a stock receiving recess and splint holding grooves in the bottom of said recess, and a comb movable up and down with relation to the pusher plate and having ribs to push the cut splints into the grooves of the pusher plate.

19. A match splint machine comprising a cutter having thin spaced knives, a pusher plate movable across the face of the cutter and having a stock holding recess and splint grooves in the bottom of said recess, a comb movable up and down with relation to the pusher plate and having ribs to push the splints into the grooves of the pusher plate, and automatic means for actuating the comb.

20. A match splint machine comprising a cutter having a series of thin spaced knives, a pusher plate movable across the face of the cutter and having stock holding means, and splint receiving grooves connected with said stock holding means, a comb movable up and down with relation to the pusher plate and adapted to push the cut splints into their holding means, and means acting in unison with the movement of the pusher plate to move the aforesaid comb.

21. A match splint machine comprising a cutter having a series of thin spaced knives, a sliding carriage having a cam track on the under side, and moving across the face of the cutter, a pusher plate on the cutter having a stock holding recess and splint receiving grooves, a comb behind the cutter having means for forcing the cut splints into their grooves, and a rocking arm connected with the comb and having its ends in line with the aforesaid cam track whereby the movement of the carriage will operate the rocking arm and comb.

22. A match splint machine comprising a cutter having thin spaced knives, a sliding carriage opposite the face of the cutter, a pusher plate on the carriage having stock holding means and splint receiving grooves, a comb behind the cutter having ribs thereon to force the cut splints into their grooves, and an operative connection between the carriage and the comb whereby the comb is actuated by the movement of the carriage.

23. In combination, a splint carrier, a splint cutter having thin spaced knives, a pusher plate movable across the face of the cutter and at right angles to the splint carrier, said pusher plate having stock holding means and individual splint holders connected with said stock holding means, and means for holding the splints in their holders in the pusher plate while they are carried by the pusher plate from the cutter to the splint carrier.

24. A match splint machine comprising feed rolls having opposed cutting edges arranged to partly cut through sheet stock as it is fed by the rolls, and cutting blades arranged behind the feed rolls and in line with the cutting parts thereof with inclined edges to complete the severance of the stock.

25. A match splint machine comprising corrugated feed rolls having cutting edges and concaved parts between the said cutting edges disposed parallel with the stock feed, and thin blades arranged behind the cutting rolls and in line with the cutting parts thereof to complete the severance of the stock.

In testimony whereof, I have signed my name to this specification this 6th day of January, 1926.

SAMUEL E. RAHE.